No. 718,373. PATENTED JAN. 13, 1903.
C. F. McKENZIE.
REVOLVING RAKE.
APPLICATION FILED AUG. 26, 1902.
NO MODEL.

Witnesses
C. F. McKenzie, Inventor.
by C. A. Snow & Co.
Attorneys

UNITED STATES PATENT OFFICE.

CYRUS F. McKENZIE, OF STORMS, OHIO.

REVOLVING RAKE.

SPECIFICATION forming part of Letters Patent No. 718,373, dated January 13, 1903.

Application filed August 26, 1902. Serial No. 121,123. (No model.)

*To all whom it may concern:*

Be it known that I, CYRUS F. MCKENZIE, a citizen of the United States, residing at Storms, in the county of Ross and State of Ohio, have invented a new and useful Revolving Rake, of which the following is a specification.

This invention relates to revolving rakes, such as are used for the purpose of gathering hay, stalks, and the like and depositing the same in windrows; and it has for its object to provide a device of this class which shall possess superior advantages in point of simplicity, durability, and general efficiency.

With these ends in view the invention consists in the improved construction, arrangement, and combination of parts, which will be hereinafter fully described, and particularly pointed out in the claims.

Figure 1:
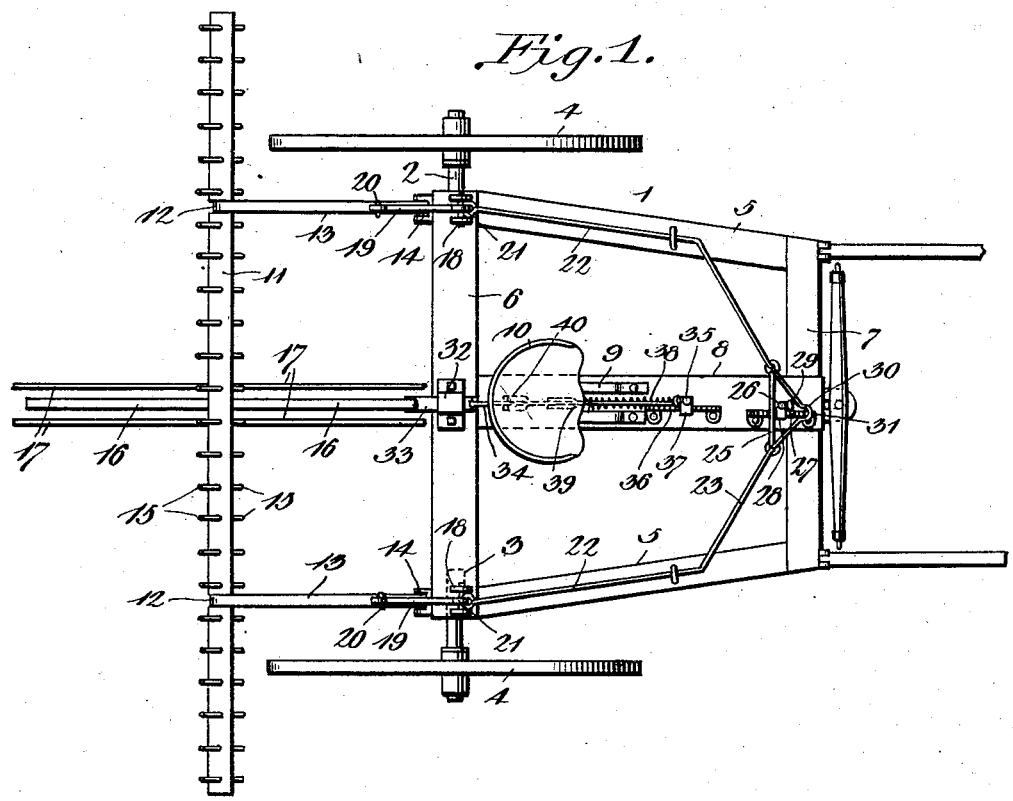
Figure 2:
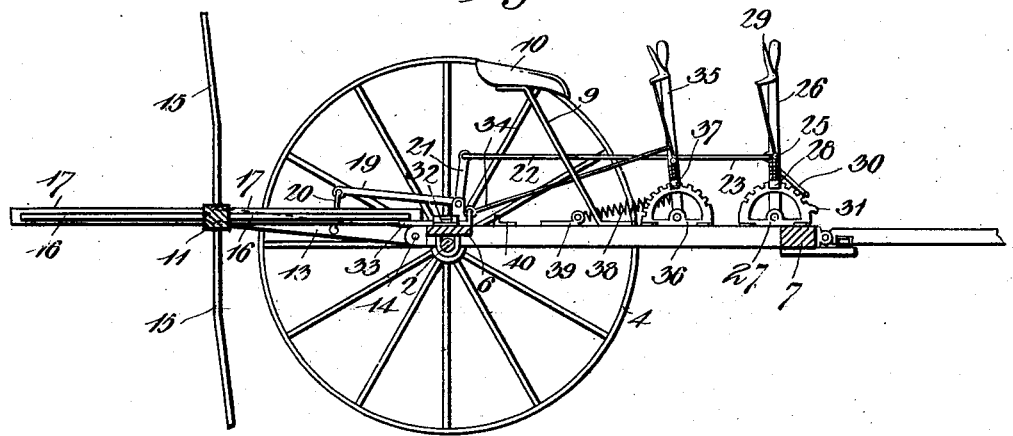

In the accompanying drawings, Figure 1 is a top plan view of a rake constructed in accordance with my invention. Fig. 2 is a sectional elevation of the same.

Corresponding parts in both figures are indicated by similar numerals of reference.

1 designates the frame of the machine, the rear beam of which may be supported upon an axle 2, or it may have stub-axles, as indicated at 3 in Fig. 1, carrying the transporting-wheels 4. The side beams 5 of the frame are preferably converged forwardly from the rear beam 6 and are connected at their front ends by the front beam 7, to which the draft is attached in any suitable manner, which is no part of my present invention.

The front and rear beams 6 and 7 are connected by a longitudinal brace-beam 8, upon which is mounted a bifurcated support 9, carrying the seat 10. This longitudinal brace-beam also carries the means for operating and adjusting the rake, as will be presently described.

The revolving rake-head 11 is supported in boxings 12 at the rear ends of arms 13, which are hinged at 14 to the rear side of the frame-beams 6. The rake-head is provided in the usual manner with oppositely-extending teeth 15 and with trip-bars 16, extending at right angles to said teeth. Adjacent to each trip-bar 16 are placed a pair of arms 17, one on each side of each trip-bar and each being somewhat longer than the said trip-bars, the object of which will be presently set forth.

The upper side of the frame-beam 6 supports a pair of brackets 18, serving for the pivotal attachment of a pair of bell-cranks 19, the rear ends of which are connected by means of links 20 with the hinged arms 13, supporting the rake. The upwardly-extending arms 21 of the bell-cranks 19 are connected with the rear ends of the side bars 22 of a frame 23, which is mounted longitudinally slidably upon the main frame. The front end of the frame 23 has a cross-bar 25, which is connected with a lever 26, the lower end of which is fulcrumed to a segment-rack 27, supported upon the frame-beam 8. Said lever 26 carries a spring-actuated lock-dog 28 of ordinary construction adapted to engage the teeth of the rack-segment and operated in the usual manner by a handle 29. The front end of the frame 23 is also provided with a downwardly-extending link or loop 30, adapted to engage a hook 31 upon the lower front end of the rack-segment 27. It will be seen by means of the lever 26 and through the intermediate mechanism the rake-head may be raised or lowered to accommodate the device to various conditions. By throwing the lever 26 to its forward limit and causing the link 30 to engage the hook 31 the rake-head may be maintained in an elevated position for transportation of the machine from one place to another.

The rear frame-beam 6 has a keeper 32, in which a trip 33 is slidably mounted to engage one of the trip-bars 16 of the rake. The trip 33 is connected, by means of a link or rod 34, with a lever 35, having pivotal connection with a rack-segment 36 and provided with a lock pawl or dog 37 to retain it in any desired position. A spring 38, extending between the legs of the bifurcated seat-support, connects said lever with a fixed point of attachment, as 39, whereby the said lever when disengaged from the rack shall be automatically forced in a rearward direction, so as to set the trip in position for operation. A stop 40 may be suitably arranged to limit the movement of the trip in a forward direction.

From the foregoing description, taken in connection with the drawings hereto annexed, the operation and advantages of my improved rake will be readily understood. When the machine progresses over the field, the rake-teeth will gather the hay, stalks, or other material in front of them. When a sufficient quantity has accumulated, the lever 35 may be operated to disengage the trip 33 from the trip-bar 16, thus permitting the rake-head to revolve and to discharge the load. The arms 17 being of a length exceeding that of the trip-bars 16 they will support the rake-head as it revolves and prevent the trip-bars from coming into contact with the ground, thus preventing said trip-bars from accumulating grit and dirt, which by adhering to the trip 33 might interfere with the instant response of the latter to its operating means.

The general construction of the device is simple and inexpensive, and it will be found to perform the work for which it is designed in a satisfactory manner.

I desire it to be understood that I do not limit myself to the structural details herein described, but reserve the right to any changes and modifications which may be resorted to without detracting from the utility of my invention or departing from the spirit and scope thereof.

Having thus described the invention, I claim and desire to secure by Letters Patent of the United States—

1. A rake of the class described comprising a frame, arms hingedly connected to the rear side of said frame, a revoluble rake-head supported by said arms, bell-crank levers mounted upon said frame, links connecting the rearward-extending arms of said bell-cranks with the arms supporting the rake-head, and a longitudinally-slidable frame connected at its rear end with the upper arms of the bell-crank levers and at its front end with an adjusting-lever having means for retaining it at the desired point of adjustment.

2. In a rake of the class described, the combination of a wheeled supporting-frame, arms hinged thereto, a revoluble rake-head supported on said arms, a longitudinally-slidable frame mounted upon the supporting-frame, bell-crank levers mounted upon the supporting-frame and having their arms connected respectively with the rake-supporting arms and with the rear ends of the side bars of the longitudinally-slidable frame, a rack-segment having a depending hook at its front end, a lever having pivotal connection with said rack-segment and with the longitudinally-slidable frame, and a link depending at the front end of the latter for engagement with the hook of the rack-segment.

3. In a rake of the class described, the combination of a wheeled supporting-frame, rake-supporting arms hinged thereto, a rack-segment having a supporting-hook, and connecting means, including an operating-lever and a link, whereby the rake-carrying arms may be elevated and supported from the depending hook of the rack-segment.

In testimony that I claim the foregoing as my own I have hereto affixed my signature in the presence of two witnesses.

CYRUS F. McKENZIE.

Witnesses:
MAY WHITAKER,
J. G. WHITAKER.